Nov. 3, 1959  M. M. CHECHIK  2,910,772
PREFABRICATED DENTAL INLAY
Filed May 10, 1955

INVENTOR
MAURICE MANLEY CHECHIK
BY
Featherstonhaugh & Co.
ATTORNEYS

United States Patent Office 2,910,772
Patented Nov. 3, 1959

2,910,772

PREFABRICATED DENTAL INLAY

Maurice M. Chechik, Vancouver, British Columbia, Canada

Application May 10, 1955, Serial No. 507,400

3 Claims. (Cl. 32—15)

This invention relates to prefabricated dental inlays.

An object of the present invention is the provision of a dental inlay which will positively fit in a hole prepared by any standard tapered bur.

Another object is the provision of dental inlays having retention elements that permit the inlays to be used for many purposes in dental work.

A prefabricated dental inlay according to the present invention comprises a substantially cylindrical body formed of a dental metal, such as gold alloy, chrome cobalt alloy, stainless steel, or any other metal that will not react with saliva or liquids or foods taken into the mouth. This body is formed with a large outer end and tapers down to a smaller inner end, and a retention element projects outwardly from the large end of the body.

There are numerous forms of retention elements that may be secured to the tapered cylindrical bodies. For example, a retention band may be fixed to the large end of the body and project outwardly therefrom. This band preferably is annealed so that it will bend without fracturing. Another form of retention element is either a ball or a tubular sleeve on the outer end of a neck which projects outwardly from the large end of the tapered body. The neck may be fixedly secured to the body, or it may be removably secured thereto in any suitable manner. One way to do this is to thread the neck and to provide the body with an internally-threaded bore so that the neck may be screwed into the latter. Yet another alternative is a retention element which is circular in cross section and externally threaded, in which case a small retaining nut is threaded on said element.

Figure 1:
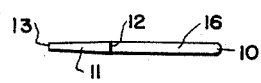
Figures 3, 4:
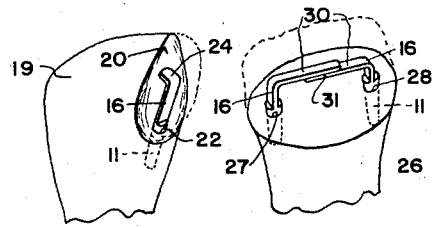
Figure 2:
Figure 5:
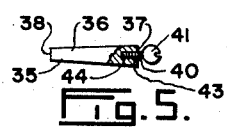
Figure 7:
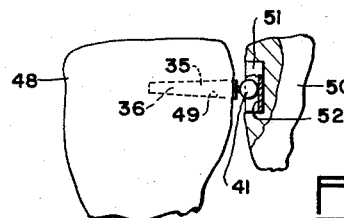
Figure 6:
Figure 8:
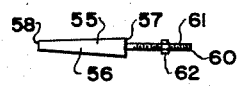
Figure 10:
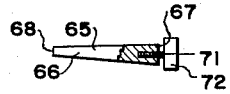
Figures 9, 11:
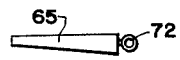
Figure 12:
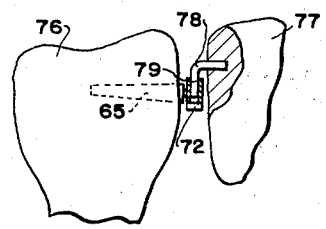

Examples of this invention are illustrated in the accompanying drawings, in which, Figure 1 is a side elevation of a dental inlay having one form of retention element, Figure 2 is a plan view of the inlay of Figure 1, Figure 3 illustrates one use of the inlay of Figure 1, Figure 4 illustrates another use of said inlay, Figure 5 is a side elevation of an alternative form of dental inlay, Figure 6 is an end elevation of the inlay of Figure 5, Figure 7 illustrates a use of the inlay of Figure 5, Figure 8 is a side elevation of a further alternative form of dental inlay, Figure 9 is an end elevation of the inlay of Figure 8, Figure 10 is a side elevation of still another form of dental inlay, Figure 11 is a plan view of Figure 10, and Figure 12 illustrates a use of the inlay of Figure 10.

Referring to Figures 1 to 4, 10 is a prefabricated dental inlay comprising a substantially cylindrical body 11 formed of a dental metal, said body having a large outer end 12 and tapering down to a smaller inner end 13. A retention element is secured to the large end of the body and projects outwardly therefrom. In this example, the retention element is in the form of a retention band 16 fixed to the end 12 of the tapered body, as clearly shown in Figures 1 and 2. It is preferable to make both the cylindrical body and the retention band of gold alloy, although, as mentioned above, other suitable metals may be used for this purpose. For best results, the retention band should be annealed so that it may be bent into different shapes without fracturing.

This dental inlay and all the others may be made in different sizes for different purposes. Tapered dental burs come in certain numbered sizes, so that it is advisable to make the tapered bodies in exactly the same sizes. When a hole is drilled in a tooth with a bur of a certain size, a dental inlay of a corresponding size is selected.

Figure 3 illustrates how a dental inlay 10 may be used when it is desired to restore a portion of a tooth. A tooth 19 has a portion 20 prepared in the usual manner. A tapered hole 22 is prepared in the tooth by a standard tapered dental bur. The body is fitted into the hole. If the fit is not snug, the inlay is removed and a little ground off the small end thereof. This is repeated until the fit is exact so that the pin is supported through its length by the tooth structure. After the body is fitted into the hole, the retention band is bent into a desired shape. In this example, the outer end 24 of the band is bent substantially at right angles to the main part of the latter, and extends towards the tooth. The body is then cemented into the prepared hole with a suitable cement which primarily acts as sealing means. The retention band now forms a suitable foundation or anchoring means for a restoration which is built up in the usual manner.

Figure 4 shows a tooth 26 from which the top has been removed. Two dental inlays 10 are used in this preparation. Tapered holes 27 and 28 are prepared in the tooth by a standard dental bur. The bodies 11 of the two inlays are firmly positioned in these holes in the manner described above. Either before or after this operation, the retention bands 16 are bent over so that the outer ends 30 thereof overlap at 31. These ends may be left in free overlapped position, or they may be pressed together by means of pliers, or they even may be soldered together, if this is felt to be necessary. A restoration is applied to the tooth in the usual manner. As the material of the restoration is pressed around the retention elements of the inlays, said material is firmly attached to the tooth.

Figures 5 to 7 illustrate another form of dental inlay. The inlay 35 comprises a substantially cylindrical body 36 having a large outer end 37 and tapering down to a smaller inner end 38. This body is formed of a dental metal that will not react with saliva, or with liquids or foods taken into the mouth. A neck 40 projects outwardly from the end 37 of the body, and a ball 41 is fixed to the outer end of said neck. This neck may be fixedly connected to the body, or as shown, it may be threaded at 43 and screwed into an internally-threaded bore 44 formed in the body. The ball and neck form a retention element carried by the body. If desired, a slot may be formed in the ball 41 for receiving a screwdriver or other instrument by means of which the ball may be rotated.

Figure 7 shows a tooth 48 having a tapered hole 49 therein. The body 36 of a dental inlay 35 has been pressed into the hole, while the ball projects outwardly from the tooth. A prosthetic appliance, part of which is illustrated at 50, has a tubular sleeve 51 therein, said sleeve being formed with a slot 52 in one side thereof. This sleeve is of such size that it slidably fits over the ball 41 with the stem 40 projecting outwardly through its slot 52. With this arrangement, there would, of course, be other teeth prepared in this manner to help support the appliance.

Figures 8 and 9 illustrate yet another alternative form of dental inlay. This inlay 55 comprises a substantially cylindrical body 56 formed of a suitable dental metal and having a large end 57 and tapering down to a smaller inner end 58. A retention element 60 projects outwardly from the large end of the body and it is substantially circular in cross section, and externally-threaded as indicated at 61. A small nut 62 is threaded on to this element.

The dental inlay 55 may be inserted in tapered holes drilled in teeth in the manner described above. It may be used to connect numerous appliances to the teeth, and particularly elements that have to be removed therefrom periodically. For example, it may be used for securing arch wires for orthodontia.

Figures 10 to 12 illustrate yet another form of dental inlay which is somewhat similar to that of Figure 5. Inlay 65 comprises a substantially cylindrical body 66 having a large outer end 67 and tapering to a smaller inner end 68. A neck 71 extends outwardly from the large end of the body and has a tubular sleeve 72 on its outer end. The neck may be fixedly secured to the body or, as shown, it may be externally threaded and fitted into an internally-threaded bore formed in the body 66.

Figure 12 shows one use of the dental inlay 65. The body 66 is fitted into a prepared tapered hole in a tooth 76. The neck 71 and sleeve 72 project outwardly from this tooth. A prosthetic appliance, partially illustrated at 77, has a pin 78 projecting therefrom with an end 79 which fits into the tubular sleeve 72.

From the above it will be seen that the prefabricated dental inlay of this invention may be used for a great many different purposes. The drawings merely illustrate a few ways in which it may be used. As the inlays are preferably made in numbered sizes, it is possible to keep a stock of these on hand so that they are readily available and correspond to the size and shape of the burs on hand. This makes it possible to restore a tooth in a very short time in one sitting. Furthermore, the tapered bodies themselves may be used as retention means for any type of gold inlay or crown which does not have sufficient retention. One way of doing this is to drill tapered holes through the inlay or crown and into the tooth at different angles to each other. Inlay bodies are then fitted and cemented in place as described above. The outer ends of the tapered bodies are cut off and ground and polished to the contour of the inlay or crown. Alternatively, one or more holes may be prepared in the inlay or crown and tooth parallel to the path of insertion thereof. The bodies are then filled as above. After this, they and the inlay or crown are removed and soldered together to form a single unit. The outer ends of the tapered bodies are cut off, ground and polished to the contour. From this it will be seen that the inlay or crown may be made retentive at one setting without having to be remade.

What I claim as my invention is:

1. A prefabricated dental inlay comprising an elongated substantially cylindrical body formed of a dental metal, said body having a large outer end and tapering evenly down from end to end to a smaller inner end in order that it may be shortened at said inner end to a desired length and pressed into a hole prepared in a tooth by a standard tapered bur of the same size and taper as the body and cemented in said hole, and a retention band connected to the large end of the body and projecting outwardly therefrom in line with the body, said band being outside the prepared tooth when the body is within the latter and being such as to connect a restoration to the tooth.

2. A prefabricated dental inlay as claimed in claim 1 in which the retention band is formed of similar metal to the body and is annealed so that it will bend without fracturing.

3. A prefabricated dental inlay comprising an elongated substantially cylindrical body formed of a dental material, said body having a large outer end and tapering evenly down from end to end to a smaller inner end in order that it may be shortened at said inner end to a desired length and pressed into a hole prepared in a tooth by a standard tapered bur of the same size and taper as the body and cemented in said hole, and a retention band connected to the large end of the body and projecting away therefrom substantially in line with the body, said band being outside the prepared tooth when the body is within the latter and being such as to connect a restoration to the tooth.

References Cited in the file of this patent

UNITED STATES PATENTS 2,227,735    Morton _____ Jan. 7, 1941

OTHER REFERENCES

Getz: "The Use of the Clasp and Leg," Dental Cosmos, 1916; pages 495–496. (Copy in 32–12.)

Salisbury, Gregory B.: "Modern Trends in Dental Acrylics," Dental Digest, April 1945, page 197, Fig. 3 (top row). (Copy in Div. 55.)